US008893142B2

(12) United States Patent
Daito

(10) Patent No.: US 8,893,142 B2
(45) Date of Patent: Nov. 18, 2014

(54) MULTIPROCESSOR SYSTEM FOR RESTRICTING AN ACCESS REQUEST TO A SHARED RESOURCE

(75) Inventor: Masayuki Daito, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1210 days.

(21) Appl. No.: 12/076,941

(22) Filed: Mar. 25, 2008

(65) Prior Publication Data

US 2008/0244608 A1   Oct. 2, 2008

(30) Foreign Application Priority Data

Mar. 26, 2007   (JP) .................................. 2007-79160

(51) Int. Cl.
*G06F 21/78* (2013.01)
*G06F 9/46* (2006.01)

(52) U.S. Cl.
CPC .............. *G06F 21/78* (2013.01); *G06F 9/468* (2013.01)
USPC ........................................................ 718/104

(58) Field of Classification Search
None
See application file for complete search history.

(56) References Cited

U.S. PATENT DOCUMENTS

| 4,785,453 | A | 11/1988 | Chandran et al. | |
| 5,950,228 | A * | 9/1999 | Scales et al. | 711/148 |
| 8,176,278 | B2 | 5/2012 | Nishiguchi et al. | |
| 2003/0126365 | A1 * | 7/2003 | Jamil et al. | 711/120 |
| 2006/0021035 | A1 * | 1/2006 | Conti et al. | 726/22 |

FOREIGN PATENT DOCUMENTS

| JP | 50-036041 A | 4/1975 |
| JP | 51-064335 A | 6/1976 |
| JP | S 62-31441 A | 2/1987 |
| JP | 3-141446 A | 6/1991 |
| JP | H 6-95974 A | 4/1994 |
| JP | 9-297711 | 11/1997 |
| JP | 2002-32352 | 1/2002 |
| JP | 2006-323675 A | 11/2006 |
| WO | WO 2005/022301 A2 | 3/2005 |

OTHER PUBLICATIONS

S. Lucci, I. Gertner, A. Gupta, U. Hegde, "Reflective-memory multiprocessor," pp. 85-94, 28th Hawaii International Conference on System Sciences (HICSS'95), 1995.*
Japanese Notification of Reasons for Refusal dated Mar. 26, 2013, with English-language translation.
Notification of Reasons for Refusal dated Jul. 31, 2012, with English-language translation.

* cited by examiner

*Primary Examiner* — Andrew Caldwell
*Assistant Examiner* — John Lindlof
(74) *Attorney, Agent, or Firm* — McGinn IP Law Group, PLLC

(57) ABSTRACT

In a conventional multiprocessor system, an access right with respect to a shared resource could not be changed in a flexible manner. The present invention provides a multiprocessor system having a first processor element (PE-A) and a second processor element (PE-B), the first processor element (PE-A) and the second processor element (PE-B) independently executing a program, in which the first processor element (PE-A) includes: a central processing unit (CPUa) for performing an operation processing based upon the program; a shared resource (18a) which is shared between the first processor element (PE-A) and the second processor element (PE-B); and a guard unit (16a) for restricting an access request from the second processor element (PE-B) to the shared resource (18a) based upon an access protection range setting value designated by the central processing unit (CPUa).

18 Claims, 9 Drawing Sheets

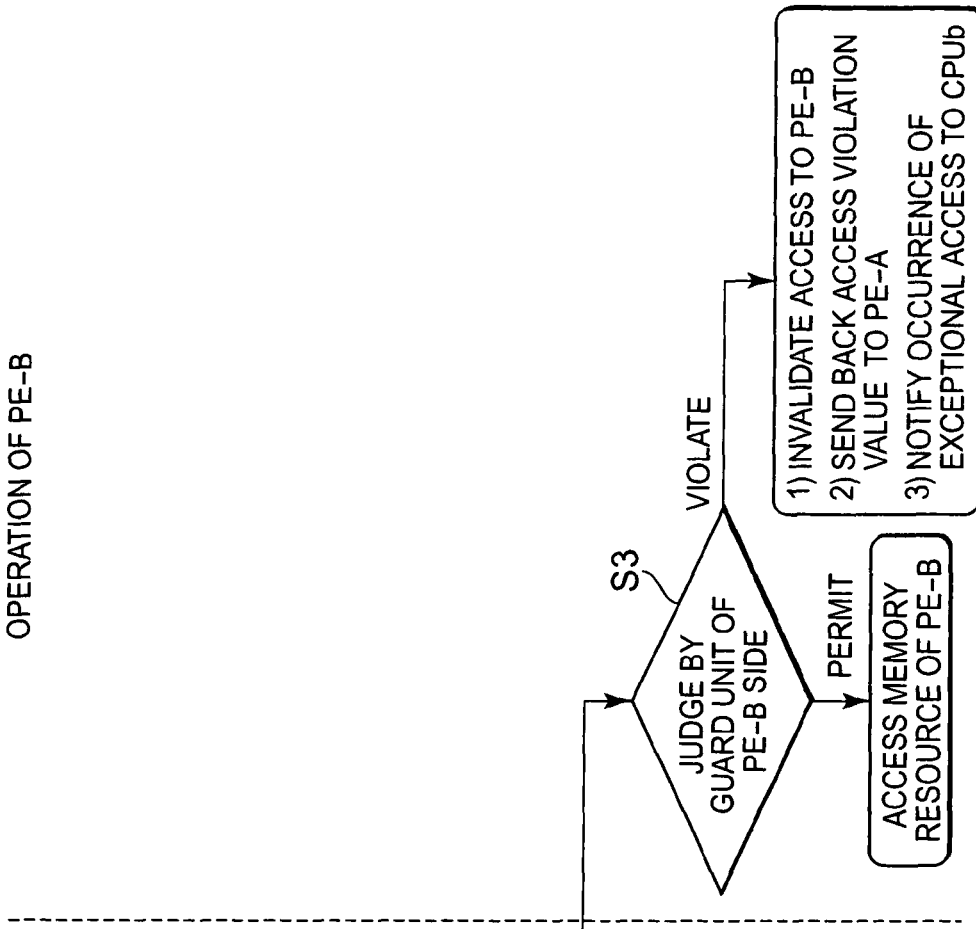
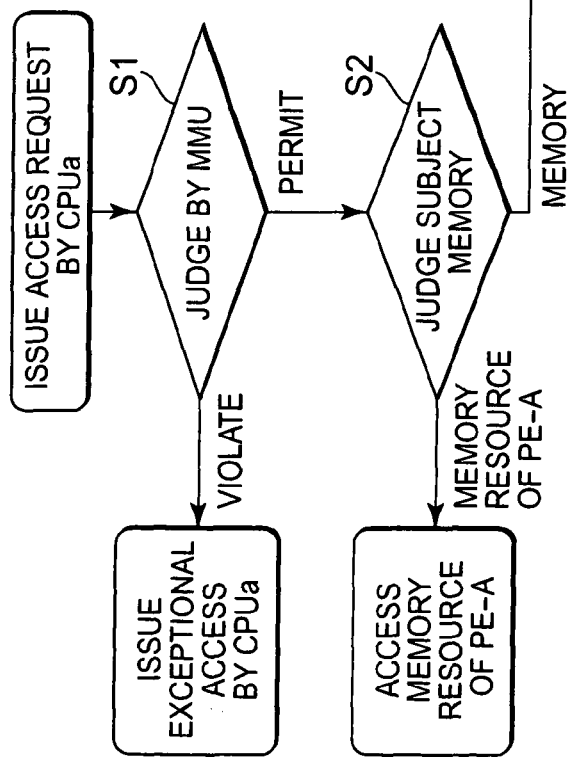
FIG. 4

MULTIPROCESSOR SYSTEM FOR RESTRICTING AN ACCESS REQUEST TO A SHARED RESOURCE

BACKGROUND OF THE INVENTION

The present invention generally relates to a multiprocessor system and an access protection method conducted in the multiprocessor system or specifically to a multiprocessor system in which each of processors has a shared resource which is commonly used by other processors, and an access protection method conducted in the multiprocessor system.

In recent years, large numbers of multiprocessor systems have been utilized in which resources such as memories are shared among a plurality of processors. In such multiprocessor systems, the following problem occurs. That is, information stored in a memory area which is utilized by one processor can be erroneously overwritten because of possible runaways of tasks executed by other processors. If such an overwrite problem occurs, the normal operation of the task under execution by the processor is impeded, so the system operation of the multiprocessor system is brought into a failure.

Under such a circumstance, JP 09-297711 A (hereinafter, referred to as "related art 1") discloses the technique related to the multiprocessor system capable of mutually avoiding the adverse influences caused by the runaways of the tasks among the plurality of processors. FIG. 9 is a block diagram for illustrating a multiprocessor system 100 disclosed in the related art 1. As represent in FIG. 9, in the multiprocessor system 100, a first processor 101A is connected to a second processor 101B via a system bus 105. Each of the first processor 101A and the second processor 101B includes a CPU board 101 and a memory board 103. The CPU board 101 includes an address producing unit 102, while the address producing unit 102 is connected to the memory board 103 via a local bus 104. In the multiprocessor system 100, when an access operation is performed from the first processor 101A to the memory board 103 of the second processor 101B, an address conversion is performed in the address producing unit 102 thereof. As a consequence, a control operation is carried out in such a manner that an area which is used by the second processor 101B in the memory board 103 to be mounted on the second processor 101B is not invaded by an access request issued from the first processor 101A.

In the related art 1, an address producing unit 102 controls access operations with respect to memory boards mounted on other processors by referring to access protection range setting values which have been previously set to a register in a fixing manner. Also, JP 2002-32352 A (hereinafter, referred to as "related art 2") discloses such a structure capable of changing the access protection range setting values by utilizing the programmable logic device (PLD) as the register of the related art 1 even after the multiprocessor system has been manufactured.

However, even in the related art 2, the access protection range setting value cannot be changed in response to the utilizing conditions of the processor. In other words, the access protection ranges cannot be dynamically set in response to the programs which are executed by the processors. Under the above-described difficulties, the multiprocessor systems disclosed in the related art 1 and 2 have a problem that the resources cannot be shared by the processors in a flexible manner.

SUMMARY OF THE INVENTION

According to the present invention, there is provided a multiprocessor system having a first processor element and a second processor element, the first processor element and the second processor element independently executing a program, in which the first processor element includes: a central processing unit for performing an information processing based upon the program; a shared resource which is shared between the first processor element and the second processor element; and a guard unit for restricting an access request issued from the second processor element to the shared resource based upon an access protection range setting value designated by the central processing unit.

In the multiprocessor system according to the present invention, the guard unit restricts the access request issued from the second processor element based upon the access protection range setting value designated by the central processing unit. In other words, the access protection range setting value can be changed in response to the program which is executed by the central processing unit. Since the above-described access restriction is conducted, in accordance with the multiprocessor system related to the present invention, the restriction of the access requests issued from the second processor element to the shared resource provided in the first processor element can be set based upon processings under execution by the first processor element. Also, it is possible to avoid the area in the shared resource, which is used by the first processor element, from being invaded by the program under execution by the second processor element.

Further, according to the present invention, there is provided an access protection method conducted in a multiprocessor system having a first processor element and a second processor element, the first processor element and the second processor element independently executing a program, the access protection method including: sending, by the second processor element, an access request with respect to a shared resource contained in the first processor element; and in the case where the access request is received by a guard unit and the access request is present within a range of access protection range setting values designated by a central processing unit employed in the first processor element, sending back, by the first processor element, an access violation value with respect to the second processor element; invalidating, by the first processor element, the access request; and notifying, by the first processor element, an occurrence of an exceptional access with respect to the central processing unit.

The access protection method conducted in the multiprocessor system according to the present invention further includes, when the access request is present within the access protection range, sending back the access violation value with respect to the second processor element which has sent the access request. As a result, the second processor element can detect that a violation occurs in a task based upon the program under execution by the second processor element. Also, the access protection method conducted in the multiprocessor system according to the present invention further includes, when the access request is present within the access protection range, invalidating the access request, and notifying the occurrence of the exceptional access with respect to the first processor element. As a consequence, the first processor element can grasp that the exceptional access occurs from the second processor element.

In accordance with the multiprocessor system and the access protection method conducted in the multiprocessor system according to the present invention, reliability of the programs executed by the processor elements respectively can be improved.

BRIEF DESCRIPTION OF THE DRAWINGS

A multiprocessor system and an access protection method in accordance with preferred embodiments will now be described, by way of example only, with reference to the accompanying drawings in which:

FIG. 4 is a flow chart for illustrating operations of the multiprocessor system of the first embodiment of the present invention;

DETAILED DESCRIPTION OF PREFERRED EMBODIMENTS

Figure 1:
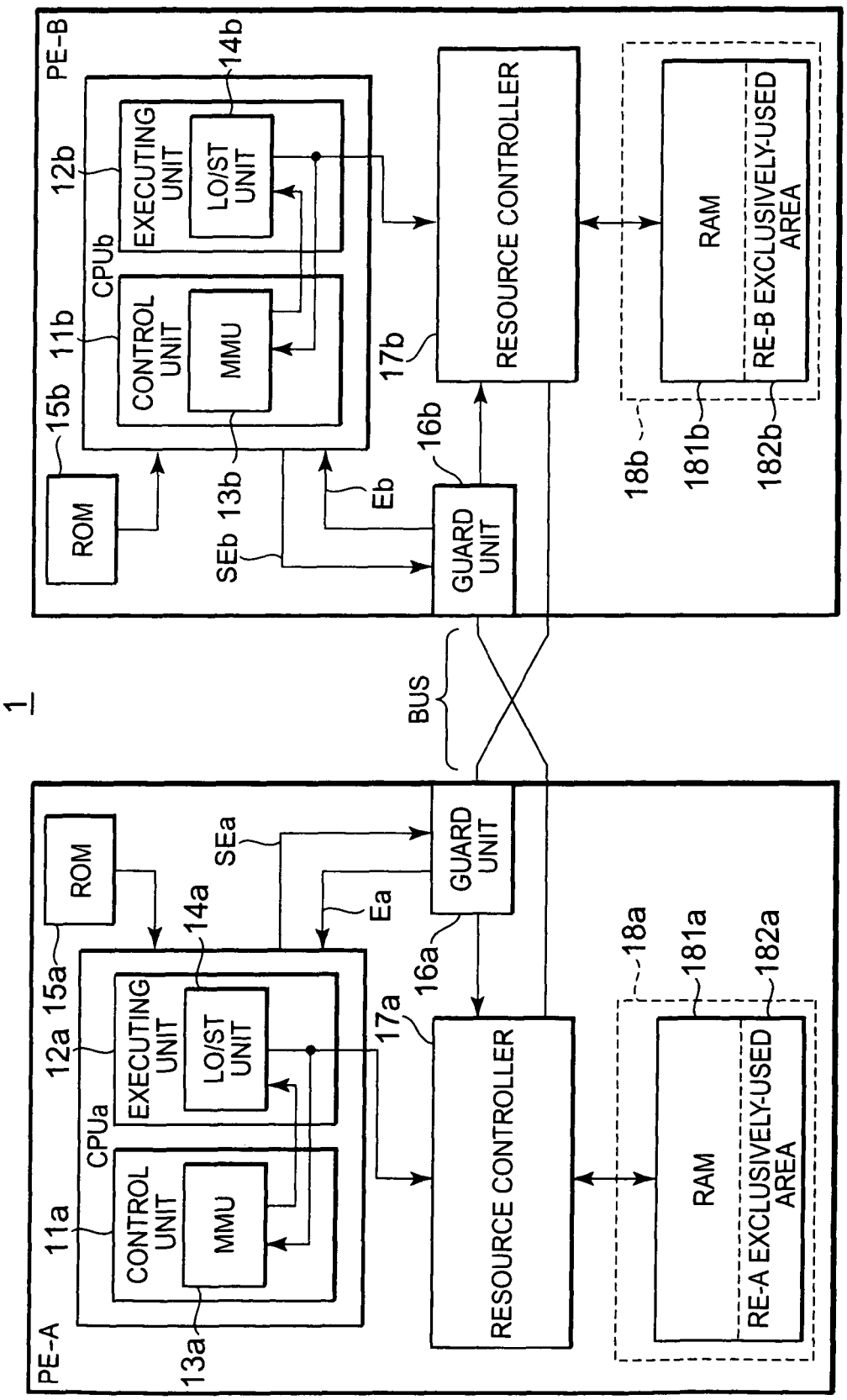
FIG. 1 is a block diagram for schematically illustrating an arrangement of a multiprocessor system according to a first embodiment of the present invention.

Referring now to drawings, a description is made of embodiments according to the present invention. FIG. 1 is a block diagram for schematically illustrating an arrangement of a multiprocessor system 1 according to one embodiment of the present invention. As shown in FIG. 1, in the multiprocessor system 1, a first multiprocessor element "PE-A" is connected to a second processor element "PE-B" via a bus.

The first processor element PE-A includes a central processing unit CPUa, a read-only memory (ROM) 15a, a guard unit 16a, a resource controller 17a, and a shared resource 18a. It should be understood that in the first embodiment, the second processor element PE-B has the same structure as that of the first processor element PE-A. In the second processor element PE-B, a central processing unit CPUb corresponds to the central processing unit CPUa; a ROM 15b corresponds to the ROM 15a; a guard unit 16b corresponds to the guard unit 16a; a resource controller 17b corresponds to the resource controller 17a; and a shared resource 18b corresponds to the shared resource 18a. As a consequence, in the first embodiment, while the first processor element PE-A is employed as an example, a structure of a processor element will now be described. It should also be understood that each of the above-described processor elements may be realized so that a central processing unit, a guard unit, and a shared resource have been manufactured on the same semiconductor substrate, or may be alternatively realized so that a plurality of processor elements have been manufactured on the same semiconductor substrate.

The central processing unit CPUa includes a control unit 11a and an executing unit 12a. The control unit 11a designates a memory area so as to manage a data saving area. In the memory area, data which is used by, for instance, a task corresponding to the unit of an execution for executing a program to be executed by the executing unit 12a, is stored. This management is performed by a memory management unit (MMU) 13a. The executing unit 12a executes various sorts of processings for each task by reading the program thereinto. Also, the executing unit 12a includes a load/store unit (LO/ST unit shown in FIG. 1) 14a. The load/store unit 14a performs a judgement based upon memory management information instructed by the MMU 13a so as to read-access, or write-access data which is used by a task with respect to the resource controller 17a.

The ROM 15a is a storage area for a program which is read by the central processing unit CPUa. It should also be noted that although the ROM 15a is employed as the program storage area in this embodiment, the above-described program storage area is not limited to the ROM 15a, but may be realized by any area to which the central processing unit CPUa can access.

While the guard unit 16a is connected via the bus to the second processor element PE-B, the guard unit 16a receives an access request sent from the second processor element PE-B. Also, to the guard unit 16a, an access protection range setting value "SEa" is inputted from the central processing unit CPUa via a protection information setting bus. The access protection range setting value SEa can be set via the protection information setting bus only from the first processor element PE-A. The guard unit 16a judges whether an access request sent from the second processor element PE-B should be permitted, or should be rejected based upon this access protection range setting value SEa and information acquired from the access request. In other words, the guard unit 16a controls an access request sent from the second processor element PE-B to the first processor element PE-A. In addition to the above-described access control, when the guard unit 16a judges that an access request should be rejected based upon the access control, the guard unit 16a notifies an occurrence of an exceptional access to both the first processor element PE-A and the second processor element PE-B by employing exceptional access notification "Ea." A detailed description will be made of the guard unit 16a later.

The resource controller 17a is a control apparatus for controlling the shared resource 18a, and controls a random access memory (RAM) in the first embodiment. The resource controller 17a produces a control signal for the shared resource 18a based upon an access request sent from the central processing unit CPUa and another access request which has passed through the guard unit 16a and then has been received. At this time, the resource controller 17a executes an arbitration processing between the access request sent from the central processing unit CPUa and the access request passed through the guard unit 16a to be received, and further produces a control signal with respect to the shared resource 18a from information contained in the access request. As the above-described information contained in the access request, there are, for example, access address information, and information for designating access attributes such as a read access request and a write access request. In the case where the access request sent from the central processing unit CPUa corresponds to an access request to the second processor element PE-B, the resource controller 17a sends an access request with respect to the second processor element PE-B.

The shared resource 18a corresponds to a resource which is commonly used between the first processor element PE-A and the second processor element PE-B. In the first embodiment, a memory is used as the shared resource 18a. As a consequence, the shared resource 18a according to the first embodiment includes a RAM 181a. Also, in the RAM 181a, a PE-A exclusively-used area 182*a* is defined. The PE-A exclusively-used area 182*a* corresponds to such a protection area which is defined based upon the above-described access protection range setting value SEa, and is varied based upon a value of the access protection range setting value SEa.

Figure 2:
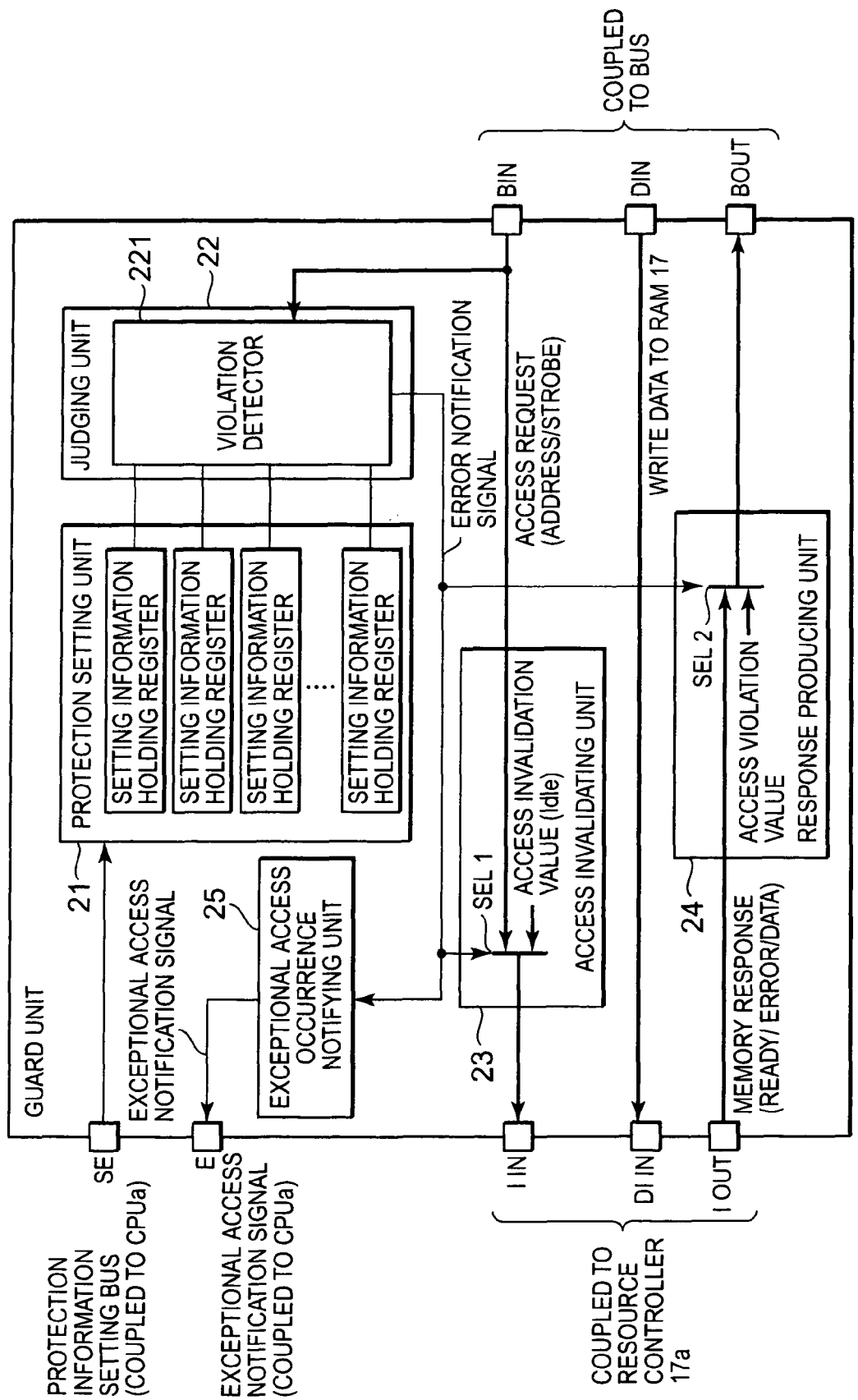
FIG. 2 is a block diagram for schematically illustrating an internal structure of a guard unit employed in the multiprocessor system of the first embodiment of the present invention.

A detailed description is made of the guard unit 16*a*. FIG. 2 is a block diagram for schematically illustrating an internal structure of the guard unit 16*a*. As shown in FIG. 2, the guard unit 16*a* includes a protection setting unit 21, a judging unit 22, an access invalidating unit 23, a response producing unit 24, and an exceptional access occurrence notifying unit 25.

Figure 3:
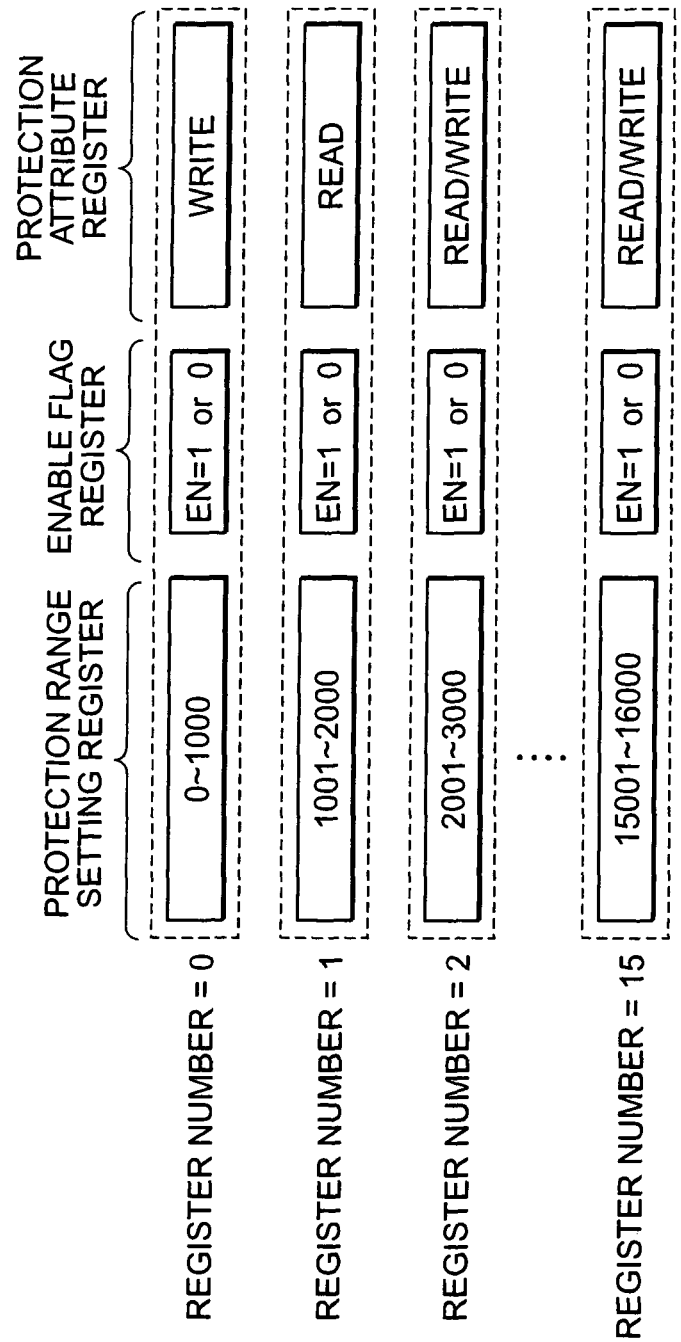
FIG. 3 is a schematic diagram of a protection information holding unit provided in the multiprocessor system of the first embodiment of the present invention.

The protection setting unit 21 includes a plurality of setting information holding registers. Then, the information related to the access protection range setting value SEa outputted by the central processing unit CPUa is stored in the plurality of setting information holding registers, respectively. While a schematic diagram of this protection setting unit 21 is shown in FIG. 3, the plurality of setting information holding registers will now be described more in detail. In the example of FIG. 3, such a case where the protection setting unit 21 includes 16 pieces of the above-described setting information holding registers is exemplified. As shown in FIG. 3, each of the plurality of setting information holding registers includes a protection range setting register, an enable flag register, and a protection attribute register. A range of an address value on a memory is stored in the protection range setting register, and this address value range corresponds to an access protection range. The protection range indicated by the protection range setting register is assumed as an exclusively-used area for the first processor element PE-A. A flag value "EN" is stored in the enable flag register. For example, when the flag value EN stored in the enable flag register is "1", this flag value EN indicates that setting of the protection range stored in the relevant protection range setting register is valid, whereas when the flag value EN stored in the enable flag register is "0", this flag value EN indicates that setting of the protection range stored in the relevant protection range setting register is invalid. The access attribute is stored in the protection attribute register. That is, the access attribute is provided in order to set whether or not an access request is rejected in the case where the access request which is issued with respect to the address range to be stored in the protection range setting register corresponds to which access attribute. As the access attributes, for instance, there are a Write (writing) access attribute, a Read (reading) access attribute, a Read/Write (reading/writing) access attribute, and the like. It should also be understood that a content to be set to this protection attribute register does not need to be necessarily changeable, but may be fixed as, for example, a write attribute.

The judging unit 22 includes a violation detector 221. The violation detector 221 compares a valid value of the protection setting range register with an access request (namely, access address and strobe) to be inputted so as to judge whether or not the access request is located within the access protection range. As a result of this judgement, when the access request is located within the access protection range, the violation detector 221 brings an error notification signal into a rejected status. In such a case where flag values of the enable flag registers provided in all of the protection setting range registers indicate invalidation, while the violation detector 221 does not output the error notification signal, the access control function of the guard unit 16*a* becomes invalid.

The access invalidating unit 23 includes a selector SELL which selects, in response to the error notification signal, one of allowing the passage of the access request sent from the second processor element PE-B, and the output of an access invalidation value. In the case where the error notification signal is under permission status, the selector SELL allows the access request sent from the second processor element PE-B to pass therethrough. On the other hand, in such a case where the error notification signal is under rejected status, the selector SELL outputs the access invalidation value. This access invalidation value corresponds to, for example, an "Idle" command on a bus which is connected to the resource controller 17*a*, namely such a command for indicating that no access request is sent to the resource controller 17*a*.

The response producing unit 24 includes another selector SEL2 which selects, in response to the error notification signal, one of allowing the passage of a memory response, and the output of an access violation value, which are outputted from the shared resource 18*a* of the first processor element PE-A. In the case where the error notification signal is under permission status, the selector SEL2 allows response information (for example, memory responses such as ready, a memory access-error, and data) outputted from the resource controller 17*a* to pass therethrough. On the other hand, when the error notification signal is under rejected status, the selector SEL2 outputs the access violation value. This access violation value is different from the memory access error value corresponding to one of the memory responses, and is such a value for notifying that the access request is access violation to the second processor element PE-B. When the first processor element PE-A or the second processor element PE-B receives the access violation value, a processing based upon the access violation value is preferentially executed in an interrupt processing manner irrespective of the processing under execution in the relevant processor element PE-A, or PE-B.

The exceptional access occurrence notifying unit 25 produces an exceptional access occurrence notification signal in response to the error notification signal. The exceptional access occurrence notification signal is, for instance, such an interrupt request signal which notifies that an exceptional access occurs with respect to the central processing unit CPUa. This interrupt request signal may be accepted at proper timing in response to a processing under execution by the central processing unit CPUa.

The guard unit 16*a* also includes a wiring which causes write data for the shared resource 18*a* to pass therethrough, the write data being sent in combination with the access request. This wiring is connected between a data input terminal "DIN" and an internal input terminal "DIIN."

Next, a description is made of operations of the multiprocessor system, while operations of the multiprocessor system 1 are exemplified in such a case where an access request is issued from the first processor element PE-A. FIG. 4 is a flow chart for illustrating the operations of the multiprocessor system 1 in this case. As shown in FIG. 4, when an access request is issued from the LO/ST unit 14*a* provided in the central processing unit CPUa, the MMU 13*a* judges whether or not the issued access request is permitted (Step S1). When the MMU 13*a* judges that the access request corresponds to a violation in Step S1, exceptional access occurrence notification for notifying that the access violation occurs is made with respect to the central processing unit CPUa. As a consequence, the central processing unit CPUa restarts, for example, a task under executions or restarts a program itself under execution. On the other hand, when the MMU 13*a* permits the access request in Step S1, the resource controller 17*a* judges a subject memory which should be accessed (Step S2).

When the resource controller 17*a* judges that the subject memory is the RAM 181*a* provided on the first processor element PE-A in Step S2, the resource controller 17*a* writes data into the RAM 181a. On the other hand, when the resource controller 17a judges that the subject memory is the RAM 181b provided on the second processor element PE-B in Step S2, the resource controller 17a sends an access request to the guard unit 16b provided on the second processor element PE-B.

The guard unit 16b judges whether or not the access request sent from the first processor element PE-A is present within the access protection range designated by the central processing unit CPUb of the second processor element PE-B (Step S3). In the case where the access request sent from the first processor element PE-A is present outside the access protection range (permission) in Step S3, the first processor element PE-A accesses the RAM 181b of the second processor element PE-B. On the other hand, in such a case where the access request sent from the first processor element PE-A is present within the access protection range (violation) in Step S3, the guard unit 16b outputs an access invalidation value to the resource controller 17b of the second processor element PE-B in order to notify an occurrence of an exceptional access with respect to the central processing unit CPUb. In addition to the executions of these processings, the guard unit 16b outputs an access violation value to the first processor element PE-A. When the first processor element PE-A receives the access violation value, the received access violation value is notified to the central processing unit CPUa, and thus, the central processing unit CPUa preferentially executes an interrupt processing based upon the access violation value irrespective of other processings under execution. As a result, the first processor element PE-A detects the occurrence of the violation and thus restarts (otherwise, stops) the task under execution. Alternatively, the first processor element PE-A restarts (otherwise, stops) the program itself under execution. Also, because the second processor element PE-B can detect that the abnormal event has occurred in the first processor element PE-A, the second processor element PE-B may perform the processing, such as the extension of the access protection range with respect to the occurrence of the abnormal event, or continuation of only a task which utilizes the access protection range.

Figure 5:
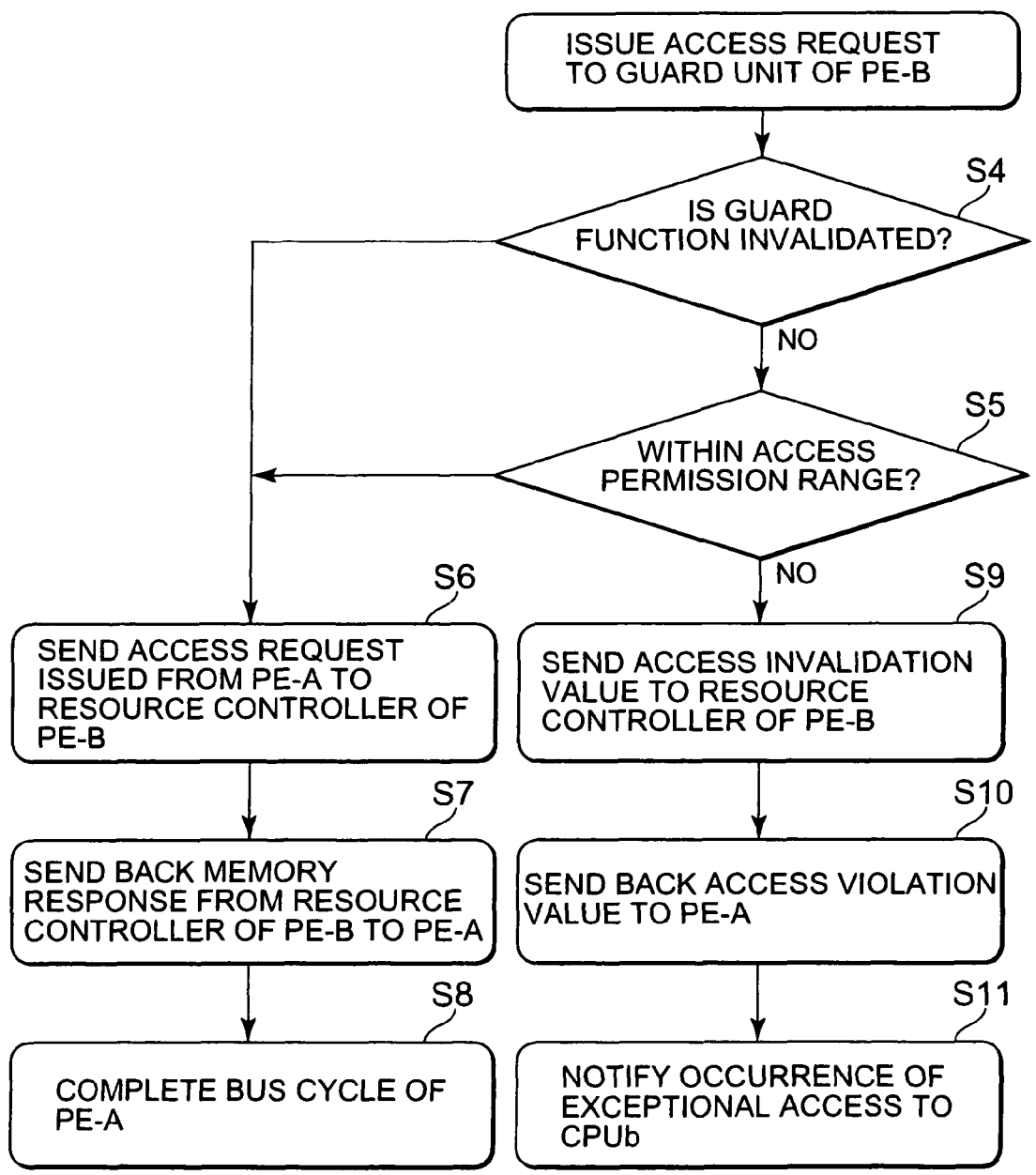
FIG. 5 is a flow chart for illustrating operations of the guard unit employed in the multiprocessor system of the first embodiment of the present invention.

FIG. 5 is a flow chart for illustrating the processings executed by the guard unit 16b in Step S3. Referring now to the flow chart of FIG. 5, operations of the guard unit 16b will be described in detail. Firstly, when an access request is issued with respect to the guard unit 16b, the violation detector 221 reads a value of a valid register by referring to all of the protection range setting registers (Step S4). At this time, in such a case where all of these protection range setting registers are invalid (branch "YES" of Step S4), the guard unit 16b passes the access request sent from the first processor element PE-A to the resource controller 17b of the second processor element PE-B (Step S6). Next, the resource control 17b sends backs the execution result of the access request via the guard unit 16b to the first processor element PE-A as a memory response (Step S7). As a result, the bus cycle of the first processor element PE-A is completed (Step S8).

On the other hand, when a valid protection range setting register is present in Step S4 (branch "NO" of Step S4), the violation detector 221 judges whether or not the access request is present within the access permission range by referring to a value of this valid protection range setting register (Step S5). When the access request is present within the access permission range (branch "YES" of Step S5) in Step S5, the guard unit 16b executes the above-described processings defined in Steps S6 to S8. On the other hand, when the access request is present outside the access permission range (branch "NO" in Step S5), the access invalidating unit 23 sends an access invalidation value to the resource controller 17b instead of the access request in order to invalidate the access request (Step S9). Also, the response producing unit 24 sends back an access violation value to the first processor element PE-A (Step S10). Further, the exceptional access occurrence notifying unit 25 outputs an exceptional access notification signal to the central processing unit CPUb (Step S11).

As previously described, one processor element according to the first embodiment includes a guard unit to which an access protection range is set by a central processing unit arranged in the own processor element. Then, the above-described guard unit judges whether or not an access request sent from another processor element is present within the access protection range, and cuts off such an access request which should be restricted. As a consequence, while each of the processor elements secures the exclusively-used memory area used by the own processor element, another memory area which is not used as the exclusively-used area can be shared by another processor element as the shared memory area. Also, the processor element according to the first embodiment includes the protection information setting register for storing the access protection range setting value which is designated by the own processor element. Under such a circumstance, the processor element according to the first embodiment can change setting of the protection range in the flexible manner. For instance, the processor element can change the protection range in response to statuses of processings under execution by the own processor element.

Further, because the access request issued with respect to the exclusively-used area is invalidated by the guard unit, there is no possibility that the data to be stored in the exclusively-used area is invaded by a task which is executed by another processor element. Under such a circumstance, the processor element of the first embodiment can improve the reliability of the task under execution by the own processor element.

Also, in the conventional multiprocessor system, an access violation caused by another processor element with respect to the own processor element could not be notified to another processor. As a consequence, in the conventional multiprocessor system, another processor element could not recover the operation by restarting the task with respect to the abnormal event occurred between the processor elements.

In contrast to the above-described conventional multiprocessor system, when the exceptional access is issued from another processor element, the guard unit according to the first embodiment produces the exceptional access occurrence notification signal with respect to the own processor element, and further, sends back the access violation value with respect to another process or element. As a result, both the own processor element and another processor element can detect the occurrence of the exceptional access. As previously described, if the occurrence of the exceptional access can be detected, the respective processor elements can prevent the enlargement of the abnormal event, can recover the abnormal task, or can perform the continuous operation based upon only a task judged to be safe. In other words, in the own processor element, the defense level with respect to the abnormal event occurred in another processor element is changed, so the task under execution by the own processor unit can be protected. Also, in another processor element, at the time when the abnormal event occurs in the task, this task is restarted, so the multiprocessor system can be recovered from the abnormal condition at an earlier stage. As a consequence, the multiprocessor system including the processor elements, according to this first embodiment, can improve the reliability thereof.

Figure 6:
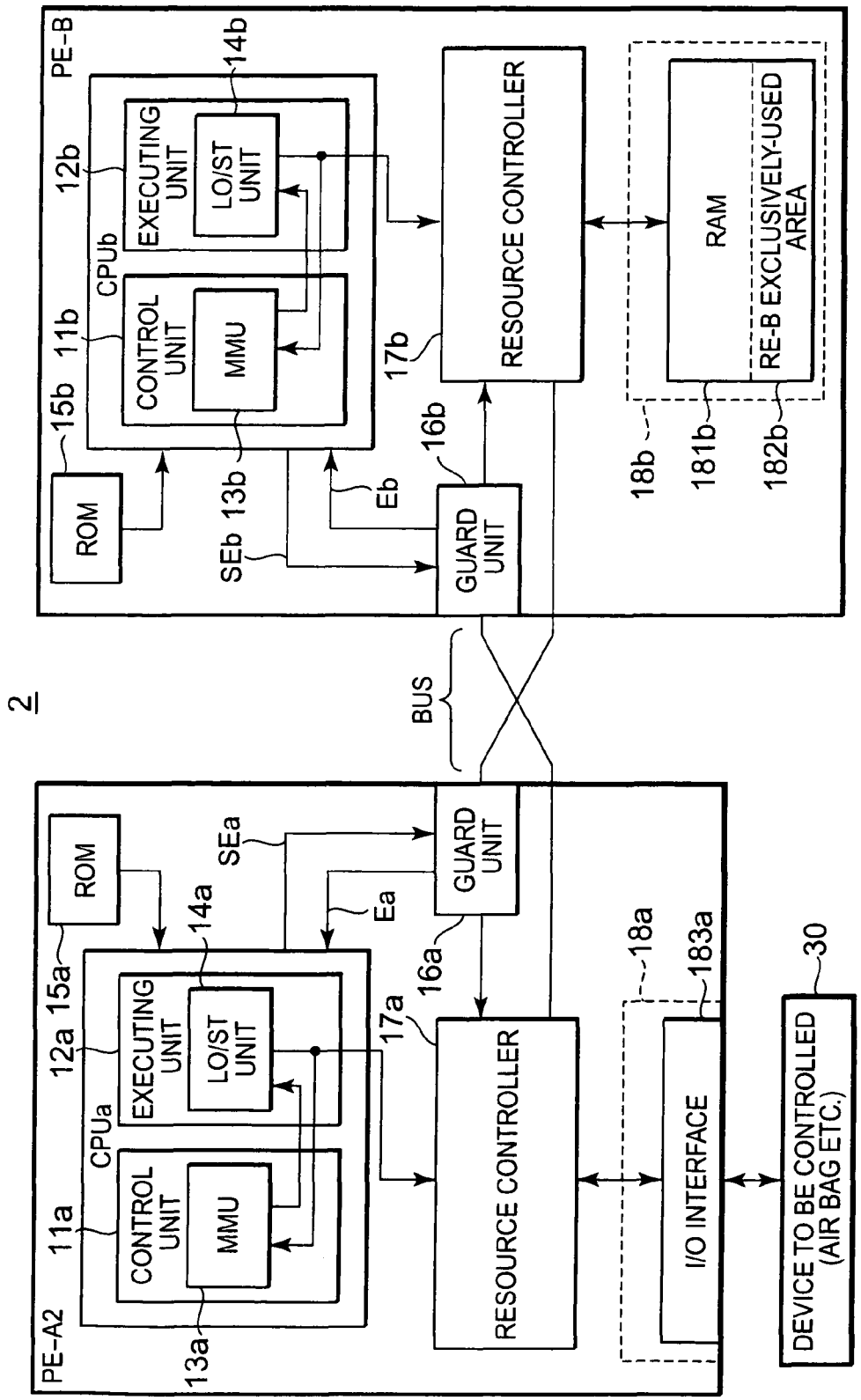
FIG. 6 is a block diagram for schematically illustrating an arrangement of a multiprocessor system according to a second embodiment of the present invention.

FIG. 6 is a block diagram for schematically illustrating an arrangement of a multiprocessor system 2 according to a second embodiment of the present invention. As shown in FIG. 6, in the multiprocessor system 2, a first processor element PE-A2 includes an I/O interface 183a as a shared resource 18a. Also, in the multiprocessor system 2, a stricture of a second processor element PE-B is identical to that of the first embodiment.

A resource controller 17a employed in the second embodiment controls the I/O interface 183a based upon an access address. A device 30 to be controlled is connected to the I/O interface 183a, while this device 30 is known as, for example, an air bag. In this example, it is so assumed that the second processor element PE-B has no an access right with respect to the I/O interface 183a.

As previously described, a guard unit 16a is provided with respect to the first processor element PE-A2 mounted on the multiprocessor system 2, so even when a runaway of task for the second processor element PE-B happens to generate an access request issued with respect to the I/O interface 183a, the issued access request is invalidated by the guard unit 16a. As a consequence, the multiprocessor system 2 can avoid that the air bag is erroneously operated with respect to a runaway of a task for another processor element.

In other words, as the shared resource 18a, not only a memory, but also various sorts of resources may be set. Also, in a multiprocessor system having such a shared resource, a guard unit is provided, so reliability of the multiprocessor system can be improved.

Figure 7:
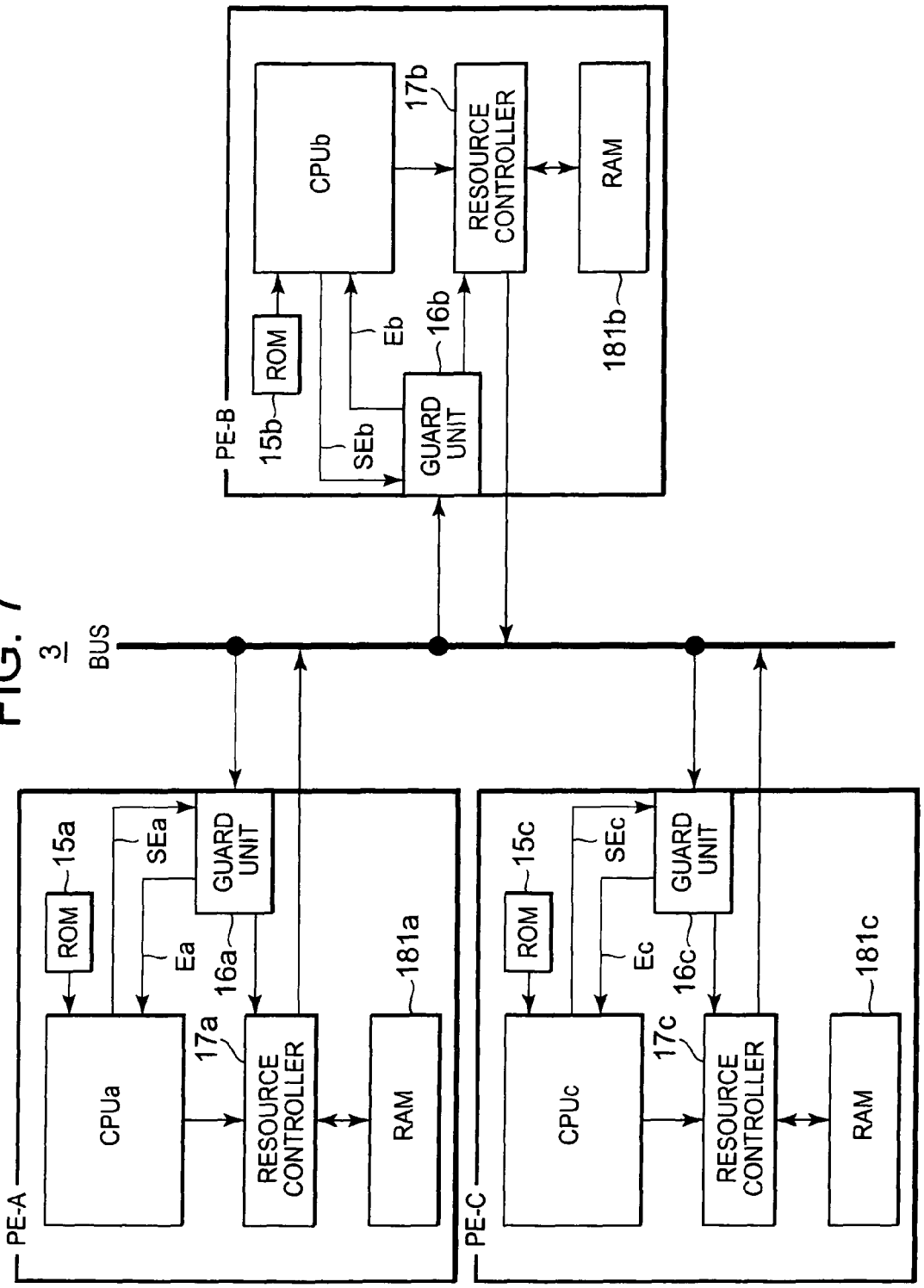
FIG. 7 is a block diagram for schematically illustrating an arrangement of a multiprocessor system according to a third embodiment of the present invention.

FIG. 7 is a block diagram for schematically illustrating an arrangement of a multiprocessor system 3 according to a third embodiment of the present invention. As shown in FIG. 7, in the multiprocessor system 3, a first processor element PE-A, a second processor element PE-B, and a third processor element PE-C are provided, the second processor element PE-B having the same structure as that of the first processor element PE-A. Then, the first processor element PE-A, the second processor element PE-B, and the third processor element PE-C are connected to each other via a bus. Even in such a case, the reliability of the multiprocessor system 3 can be improved by a guard unit 16 in a similar manner to that of the first embodiment.

As described in the multiprocessor system 3, in the case where two or more processor elements are connected to each other, a multi-master bus where a plurality of processor elements each constitute a master, for example, may be employed as a bus structure.

Figure 8:
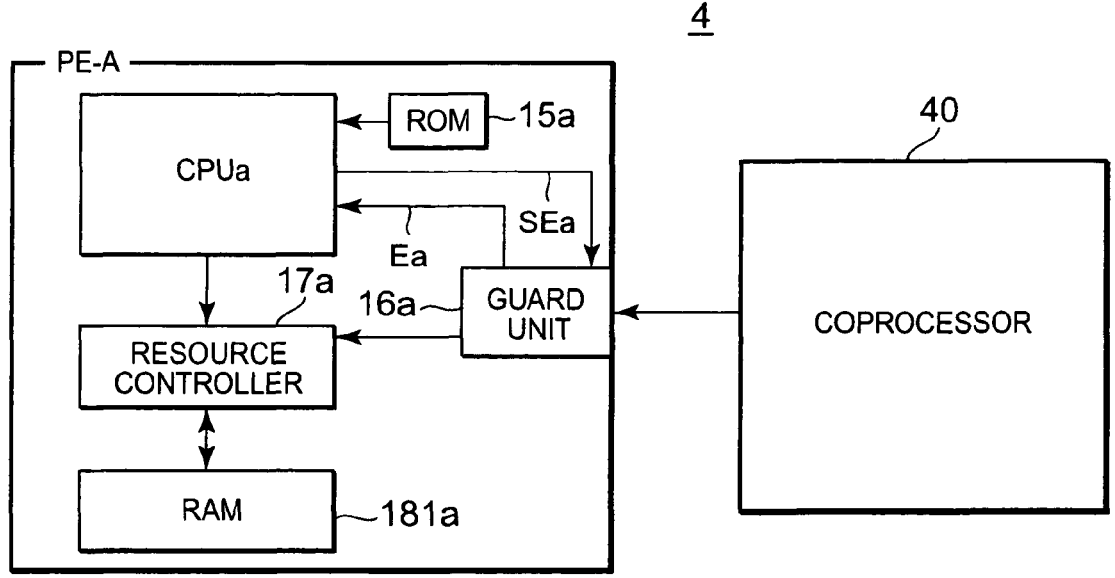
FIG. 8 is a block diagram for schematically illustrating an arrangement of a multiprocessor system according to a fourth embodiment of the present invention.
Figure 9:
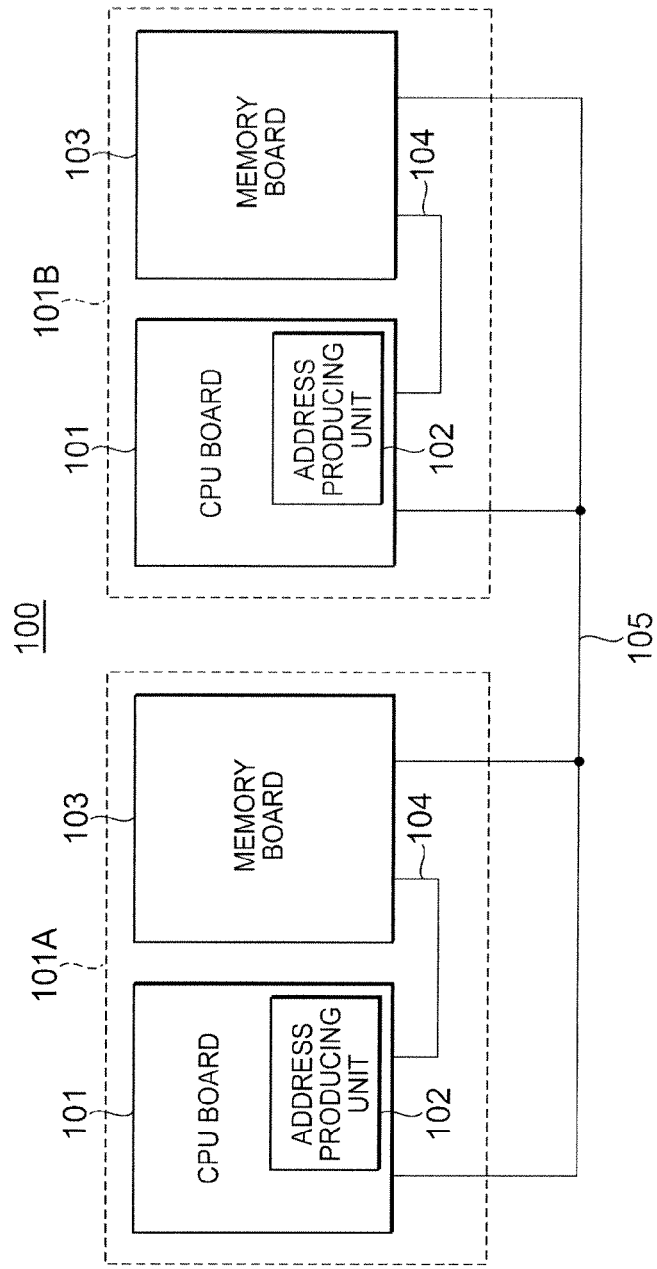
FIG. 9 is a block diagram for schematically illustrating the arrangement of the multiprocessor system according to the related art.

FIG. 8 is a block diagram for schematically illustrating an arrangement of a multiprocessor system 4 according to a fourth embodiment of the present invention. As shown in FIG. 8, the multiprocessor system 4 uses a coprocessor 50 as a second processor element, which does not include a guard unit and a shared resource. In this case, even when an abnormal event occurs in a task executed in the coprocessor 40 and thus an access request is issued with respect to an access protection range, the guard unit 16a of the first processor element PE-A invalidates this access request. In this embodiment, because the first processor element PE-A includes the guard unit 16a, the task which is executed in the first processor unit PE-A can be protected.

In other words, in accordance with the multiprocessor system according to the present invention, in the multiprocessor system arranged by employing a plurality of processor elements, if a guard unit is mounted on at least one piece of the above-described multiprocessor element, then the reliability of the multiprocessor system can be improved.

It should also be understood that the multiprocessor system of the present invention is not limited only to the above-described embodiments, but may be properly modified without departing from the scope of the present invention. For instance, protection information to be stored in the protection setting unit 21 is not limited only to the access protection range setting values of the above-described embodiments, but may be properly modified in correspondence with systems.

What is claimed is:

1. A multiprocessor system comprising a first processor element and a second processor element each independently executing a program,
   wherein said first processor element comprising:
      a central processing unit performing an information processing based upon the program;
      a shared resource capable of being accessed with the second processor element; and
      a guard unit coupled to said central processing unit that is configured to restrict an access request issued from the second processor element to the shared resource, the guard unit restricting the access request based upon an access protection range setting value that is designated by the central processing unit,
   wherein the guard unit comprises:
      a protection setting unit for holding the access protection range setting value which is sent from the central processing unit via a protection information setting bus;
      a judging unit for judging whether or not the access request is present within a range of the access protection range setting value based upon information held in the protection setting unit; and
      an exceptional access occurrence notification unit, which outputs an exceptional access notification signal to the central processing unit, if the access request is present within the range of the access protection range setting value,
   wherein the exceptional access notification signal is processed in an interrupt processing manner by the central processing unit and the central processing unit extends the access protection range after output of the exceptional access notification signal such that the extended access protection range is wider than the access protection range before output of the exceptional access notification signal,
   wherein the protection setting unit comprises a plurality of setting information holding registers for holding setting information that is different from each other,
   wherein said plurality of setting information holding registers comprise:
      protection range setting registers for holding thereinto access ranges that are protected, respectively; and
      enable flag registers for holding flag values which indicate that the values of the plurality of setting information holding registers are one of a valid value and an invalid value,
   and
      wherein the enable flag registers can change the flag values in response to statuses of processing under execution by the first processor element.

2. The multiprocessor system according to claim 1, wherein the shared resource comprises a memory, said memory including:

an exclusively-used area for the first processor element, said exclusively-used area being set based upon the access protection range setting value; and
a shared area capable of being shared by the first processor element and the second processor element.

3. The multiprocessor system according to claim 1, wherein the shared resource comprises an exclusively-used external interface for the first processor element, to which an access right is set based upon the access protection range setting value.

4. The multiprocessor system according to claim 1, wherein the protection setting unit further comprises protection attribute registers for holding access attributes with respect to the access ranges.

5. The multiprocessor system according to claim 1, wherein the judging unit judges the access request based upon an access protection range setting value held in the setting information holding register that the flag value indicates a validness among the plurality of setting information holding registers, and
wherein, when all of the flag values indicate invalidation, the judging unit cancels the restriction of the access request by the guard unit.

6. The multiprocessor system according to claim 1, wherein the guard unit further comprises an invalidating unit which
outputs, if the access request is present within the range of the access protection range setting value, an access invalidation value to the first processor element instead of the access request, and
allows, if the access request is present outside the range of the access protection range setting value, the access request to pass therethrough.

7. The multiprocessor system according to claim 1, wherein the guard unit further comprises a response producing unit which
allows, if the access request is present outside the range of the access protection range setting value, response information outputted from the shared resource to pass therethrough, and
outputs, if the access request is present within the range of the access protection range setting value, an access violation value with respect to the second processor element.

8. The multiprocessor system according to claim 7, wherein the second processor element preferentially executes, if the access violation value is sent back from the first processor element, a processing based upon the access violation value in an interrupt processing manner irrespective of the processing under execution by the central processing unit.

9. The multiprocessor system according to claim 1, wherein, in the first processor element, the central processing unit, the shared resource, and the guard unit are manufactured on a same semiconductor substrate.

10. The multiprocessor system according to claim 1, wherein the first processor element and the second processor element are manufactured on a same semiconductor substrate.

11. A multiprocessor system comprising a first processor element and a second processor element each independently executing a program,
wherein said first processor element comprises:
a central processing unit performing an information processing based upon the program;
a shared resource capable of being accessed with the second processor element; and
a guard unit coupled to said central processing unit that is configured to restrict an access request issued from the second processor element to the shared resource, the guard unit restricting the access request based upon an access protection range setting value that is designated by the central processing unit,
wherein the guard unit comprises:
a protection setting unit for holding the access protection range setting value which is sent from the central processing unit via a protection information setting bus;
a judging unit for judging whether or not the access request is present within a range of the access protection range setting value based upon information held in the protection setting unit; and
an exceptional access occurrence notification unit, which outputs an exceptional access notification signal to the central processing unit, if the access request is present within the range of the access protection range setting value,
wherein the exceptional access notification signal is processed in an interrupt processing manner by the central processing unit, and the central processing unit extends the access protection range after output of the exceptional access notification signal such that the extended access protection range is wider than the access protection range before output of the exceptional access notification signal.

12. The multiprocessor system according to claim 11, wherein the guard unit comprises a response producing unit which allows, when the access request is present outside the range of the access protection range setting values, response information outputted from the shared resource to pass therethrough and outputs, when the access request is present within the range of the access protection range setting values, an access violation value with respect to the second processor element.

13. A multiprocessor system comprising a first processor element and a second processor element each independently executing a program,
wherein said first processor element comprises:
a central processing unit performing an information processing based upon the program;
a shared resource capable of being accessed with the second processor element; and
a guard unit coupled to said central processing unit that is configured to restrict an access request issued from the second processor element to the shared resource, the guard unit restricting the access request based upon an access protection range setting value that is designated by the central processing unit,
wherein the guard unit comprises:
a protection setting unit for holding the access protection range setting value which is sent from the central processing unit via a protection information setting bus;
a judging unit for judging whether or not the access request is present within a range of the access protection range setting value based upon information held in the protection setting unit; and
an exceptional access occurrence notification unit, which outputs an exceptional access notification signal to the central processing unit, if the access request is present within the range of the access protection range setting value,
wherein the exceptional access notification signal is processed in an interrupt processing manner by the central processing unit, and the central processing unit extends the access protection range after output of the exceptional access notification signal such that the extended access protection range is wider than the access protection range before output of the exceptional access notification signal, wherein the guard unit comprises a response producing unit which allows, when the access request is present outside the range of the access protection range setting values, response information outputted from the shared resource to pass therethrough and outputs.

14. The multiprocessor system according to claim 1, wherein the central processing unit changes the access protection range and performs only the task, that utilizes the access protection range, with respect to the exceptional access notification signal.

15. The multiprocessor system according to claim 11, wherein the central processing unit changes the access protection range and performs only the task, that utilizes the access protection range, with respect to the exceptional access notification signal.

16. The multiprocessor system according to claim 13, wherein the central processing unit changes the access protection range and performs only the task, that utilizes the access protection range, with respect to the exceptional access notification signal.

17. The multiprocessor system according to claim 1, wherein the central processing unit dynamically changes the access protection range after output of the exceptional access notification signal.

18. The multiprocessor system according to claim 1, wherein the central processing unit dynamically changes the access protection range according to the exceptional access notification signal.

* * * * *